May 4, 1948.　　　　　O. G. COFFMAN　　　　　2,440,896
DELAYED START ALTERNATING CURRENT MOTOR
Filed April 9, 1946
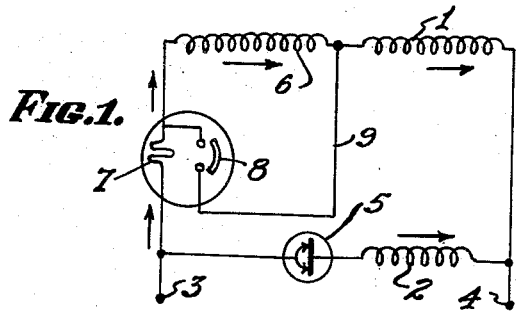
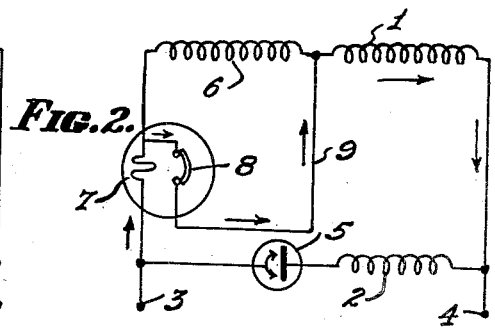
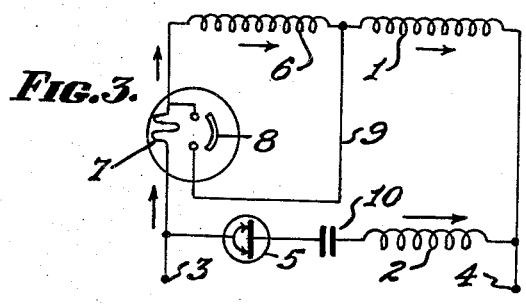
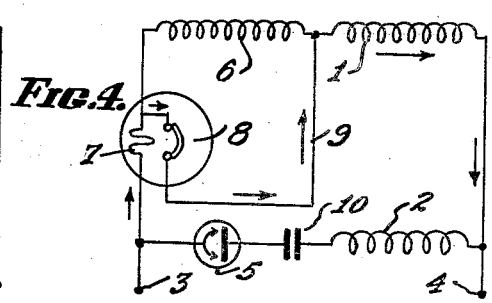
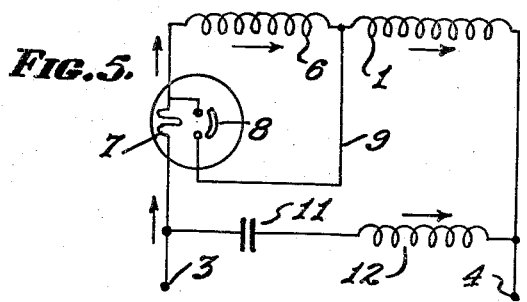
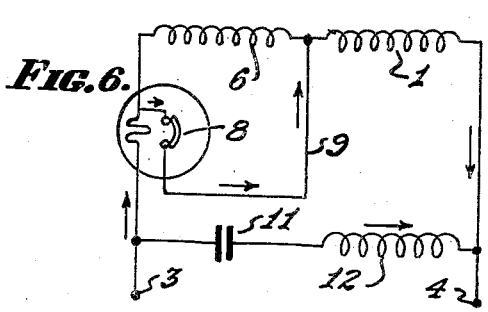
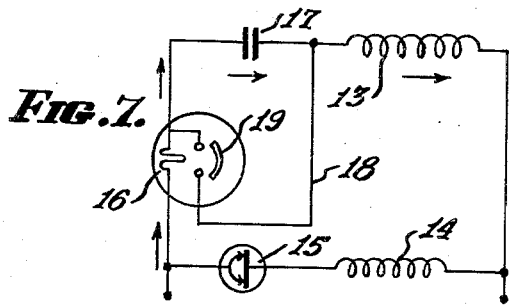
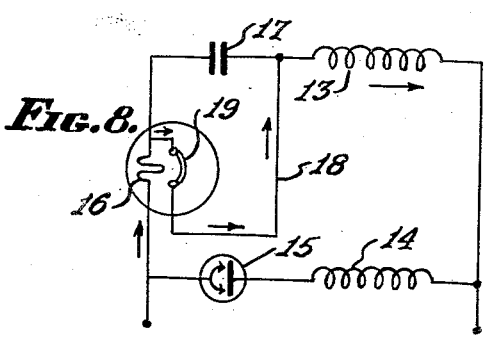
INVENTOR.
OLEN G. COFFMAN.
BY Allen & Allen
ATTORNEYS.

UNITED STATES PATENT OFFICE 2,440,896

DELAYED START ALTERNATING-CURRENT MOTOR

Olen G. Coffman, Springfield, Ohio, assignor to Robbins & Myers, Inc., Springfield, Ohio, a corporation of Ohio Application April 9, 1946, Serial No. 660,611

4 Claims. (Cl. 318—221)

In certain uses of electric motors it is desirable to delay the starting thereof, after current has been applied across the input thereto. One example is the use of fan motors in connection with various types of unit heaters, in which it is desired that the heater come up to the temperature before the fan is put into operation, but it is desirable to call for a single switching operation for the apparatus. Thus the operator would operate but a single switch to turn on the heater and the motor.

There have been several arrangements made for delayed starting of electric motors, and in these the defect of a considerable humming of the motor has been a cause of dissatisfaction with the installation.

It is the object of my invention to provide for delayed starting using a thermostatic element for this purpose, which element remains in circuit with the principal motor winding so as to maintain the conditions for running, once this has been initiated. Essentially, the starting of induction motors arises from a starting winding being in space and time quadrature with the principal running winding, and according to my invention an impedance in series with said winding is used which results in preventing the motor from developing the required torque impulses for starting from stopped position, preferably this impedance being an inductance in the form of an equal and opposite winding which may be of small wire and relatively inexpensive. Such an inductance acts so as to minimize the hum incident to applying current to the motor.

In the drawings, I have illustrated a series of arrangements in diagrammatic form, but these are illustrative examples and not intended as excluding other arrangements which come within the inventive concept of said examples, which inventive aspect will be set forth in the appended claims.

In the drawings:

Fig. 1 is a diagram of a split phase motor having a starting winding, and including my novel arrangement.

Fig. 2 is a diagram illustrating the position of the switch elements in running position.

Fig. 3 is a diagram of a like motor to the above except that the starting winding includes a condenser so that it is of capacitor type.

Fig. 4 is a view of the motor of Fig. 3 in running position.

Fig. 5 is a diagram of a motor of the type using an auxiliary winding which remains in operation while the motor is running, said motor being of the permanent split condenser type.

Fig. 6 is the companion view showing this motor when running.

Fig. 7 is a diagram showing a modified form of impedance over the one shown in the previous figures, otherwise being like Fig. 1.

Fig. 8 is the companion diagram showing the motor of Fig. 7 when running.

Referring first to Fig. 1, the main field winding is indicated at 1 and the starting field winding at 2. As indicated, the two windings are in parallel across the main terminals 3 and 4 of the motor circuit. Located in series with the starting winding is a centrifugal switch 5 which is normally closed but when energized by the rotation of the motor will open thus cutting out the starting winding.

Also wound on the field of the motor along with the principal winding is an inductive impedance in the form of another winding 6 which is equal and oppositely turned to the main field winding and located so as to directly neutralize the flux which would otherwise result from the passing of current through the winding which it opposes. This added equal and opposite winding is connected in series with the principal winding.

In series with the main and opposing winding there is also a thermostatic element 7, which is connected to operate a switch 8. The switch 8 closes a short circuit 9 for the opposing winding, which short circuit does not include the thermostatic element.

With this arrangement and referring first to Fig. 1 the act of applying current, will be to energize the two opposed windings of the field, and also the starting winding which is in space and time quadrature thereto. At the same time, the thermostatic element will begin to heat up. There will be no starting torque for the motor, however, because the principal field winding will be neutralized by the opposing winding.

Referring now to Fig. 2, the ultimate closing of the switch 8 by the heated thermostatic element, a matter which can be controlled as to time by the design used, will set up the short 9 across the opposing winding 6. At this moment the starting winding being in quadrature will result in the motor starting up, and as soon as it is built up to running speed, the centrifugal switch 5 will open, as shown in Fig. 2. The starting winding will then no longer be supplied with current. The thermostatic element will, however, remain heated since it is still in series with the principal field winding.

If the device is shut down for a moment and started up again, the heated thermostatic element will not at once lose its heat due, among other things, to the effect of the stored heat in the thermostat element and the motor assembly heater itself, if the motor is being used as an auxiliary to a unit heater, and thus the device will start up again more promptly than if the parts had been permitted to cool down. This performance is desirable in such a combination because the reason for holding back the fan operation is to permit the unit heater to come up to temperature.

In Fig. 3 the parts have been numbered alike to Fig. 2, and the difference consists in the presence of the condenser 10 in series with the starting winding. It is evident that the combination will behave in the same manner so far as delayed starting is concerned. Fig. 4 shows full running position.

In Fig. 5 the parts again have been numbered alike. This diagram shows the permanent split condenser type of motor in which the condenser 11 and the auxiliary winding 12 are always in circuit, no centrifugal switch being used. The winding 12 creates starting torque as well as running torque, but the delayed starting is again the same due to the neutralized flux in the main field winding. Fig. 6 shows the full running position for this motor design.

In Fig. 7 the impedance used to neutralize the flux resulting from the initial application of current so as to prevent starting, is a condenser. In this case, the main field winding is indicated at 13, the starting winding at 14, with its centrifugal switch 15. The thermostatic element 16 is in series with the main field winding, and the condenser 17 is in series with the main field winding, and the thermostatic element. In this case, as in the ones employing the opposing winding, the condenser 17 has connected across it a short circuit 18, controlled by the switch 19 which is under the influence of the thermostatic element.

When current is applied to the motor of this diagram, the condenser 17 has a value selected so as to change the phase of the main field winding so that it is no longer in time quadrature to the starting winding, but instead brings it substantially into phase with the starting winding. As a result of this, the starting winding does not react on the flux resulting from current application so as to set up a torque impulse to start the motor.

In Fig. 8 is shown the running position for the motor of this diagram, with the switch 19 closed, short circuiting the phase changing condenser, and with the starting winding cut out by the centrifugal switch.

This form of device does not minimize the hum, but is quite inexpensive. Since it is of the same "family" as the preferred construction, I have included it in this specification.

It has not been attempted to show every possible motor diagram with which my invention will operate, but the above will indicate to the man skilled in the art, the mode of application of my invention to various motors equipped with starting windings of one kind or another.

Having thus described my invention what I claim as new and desire to secure by Letters Patent is:

1. In an electric motor a principal field winding, a starting field winding in parallel therewith, an impedance in series with said principal field winding, a thermostatic element in series with the principal field winding, a switch arranged to short circuit the impedance without short circuiting the thermostatic element said switch operated by the thermostatic element, said impedance arranged to render the flux resulting from application of current to the field windings ineffective to develop starting torque.

2. The motor of claim 1 in which the impedance is a winding substantially equal and opposite to the winding with which it is in series.

3. The motor of claim 1 in which the impedance is a condenser of a capacity to result in bringing the current in the winding with which it is in series substantially into phase with the current of the other winding.

4. The motor of claim 1 in which a centrifugal switch operated by the motor is arranged in series with the starting winding, and the impedance is a winding equal and opposite to the principal winding.

OLEN G. COFFMAN.

REFERENCES CITED

The following references are of record in the file of this patent:

UNITED STATES PATENTS

| Number | Name | Date |
|---|---|---|
| 399,292 | Seimens | Mar. 12, 1889 |
| 2,150,117 | Griffith | Mar. 7, 1939 |
| 2,262,869 | Weinott | Nov. 18, 1941 |

FOREIGN PATENTS

| Number | Country | Date |
|---|---|---|
| 598,544 | Germany | June 12, 1934 |